US006434362B1

(12) United States Patent
Schier

(10) Patent No.: US 6,434,362 B1
(45) Date of Patent: Aug. 13, 2002

(54) METHOD OF RECEIVING MESSAGES, AND ELECTRICAL APPLIANCE FOR IMPLEMENTING THE METHOD

(75) Inventor: Achim Schier, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,039

(22) Filed: Jun. 22, 1999

(30) Foreign Application Priority Data

Oct. 24, 1996 (DE) ........................................ 196 44 190

(51) Int. Cl.[7] ................................................ H04B 1/00

(52) U.S. Cl. ...................... 455/45; 455/186.1; 455/404; 455/419

(58) Field of Search ................................ 455/45, 186.1, 455/88.1, 419, 420, 527, 404; 340/901, 902, 904

(56) References Cited

U.S. PATENT DOCUMENTS 4,048,619 A * 9/1977 Forman et al. ............... 455/45
5,572,201 A * 11/1996 Graham et al. ............... 455/45
5,867,776 A * 2/1999 Noda ...................... 455/186.1

FOREIGN PATENT DOCUMENTS

| | | |
|---|---|---|
| DE | 39 12 945 | 10/1990 |
| DE | 41 18 970 | 12/1992 |
| DE | 44 08 930 | 9/1995 |
| FR | 2 630 278 | 10/1989 |
| WO | 90 10359 | 9/1990 |

* cited by examiner

*Primary Examiner*—Lee Nguyen
(74) *Attorney, Agent, or Firm*—Kenyon & Kenyon

(57) ABSTRACT

A method and system for receiving messages with a receiver in a motor vehicle, wherein receipt of the message interrupts audio reproduction by the device, and receipt must be confirmed by the user. The device may include an interrupt feature for interrupting audio reproduction and for confirming receipt of a message.

14 Claims, 2 Drawing Sheets

METHOD OF RECEIVING MESSAGES, AND ELECTRICAL APPLIANCE FOR IMPLEMENTING THE METHOD

FIELD OF THE INVENTION

The present invention is based on a method for receiving messages, and on an electrical device for carrying out the method, according to the species defined in the independent claims.

Methods and devices with which so-called short message services (SMS) can be transmitted to the individual subscribers of the radio network are known from mobile radio technology. A short message of this kind has, for example in the E-network, a maximum length of 160 characters. The arrival of a message of this kind is made known via an audio sequence. A message of this kind can easily be transmitted in a radio network, since a digital mobile radio device maintains contact with radio stations as long as it is activated.

It is also known that traffic data, emergency transmissions, etc. can be delivered via broadcast radio to users of radio devices. The radio signals sent in this fashion are equipped by the transmitter with an identifier, and are recognized by the radio devices. In the specific case of an emergency transmission, however, there is no guarantee that the person being sought is indeed receiving the message.

German Patent Application No. 41 18 970 describes an automobile radio and a method for receiving messages, the messages, for example, consisting of special data such as radio traffic messages, which are transmitted as part of a broadcast radio program, and are recorded by way of a recorder device of the automobile radio. For control purposes, i.e., in order to activate and deactivate the recorder device, a signal tone transmitted as part of the broadcast radio program at the beginning and end of a special message is analyzed.

SUMMARY

The method according to the present invention, has the advantage that the message is stored in a memory, and operation of the device is interrupted until the time at which the user acknowledges receipt of the message.

This has the advantage of ensuring that an emergency call has a higher probability of reaching the person being sought. Because of the necessity of acknowledging receipt of the information, the information is forwarded to the user in all cases, even if he or she is not currently in the vehicle.

According to one embodiment of the present invention, the message is transmitted via broadcast radio.

According to the present invention, an improvement is achievable if a message directed to a radio receiver equipped with an identifier can be passed on and accepted. It is particularly advantageous if the message received by way of the radio receiver is supplemented with a spoken message which was sent via broadcast radio. Broadcast radio data are thereby combined in simple fashion with data that are received via the direct radio connection.

A digital radio receiver can advantageously be used in this context. For example, according to one embodiment of the present invention the radio receiver has an identifier corresponding to the vehicle license plate number.

It is further advantageous if the entire message is transmitted via the radio receiver to the device in the vehicle. A further advantage consists in displaying the message on a display device, or playing the message through a voice output.

According to one embodiment of the present invention, the presence of a message is indicated by an audio sequence or by a luminous indicator. Confirmation of receipt of the message can be accomplished by using an input key or also speaking a voice command into a microphone which is particularly advantageous.

According to one embodiment of the present invention, the data which are received via the radio receiver can be supplemented by referencing this data against data on a storage device such as a CD (compact disk) For this purpose, the address and the person being sought can be associated with a known telephone number stored on the storage device which may contain, for example, names and addresses.

According to one embodiment of the present invention, an electrical device such as an automobile radio device, has the advantage that it can interrupt audio reproduction by way of a switching mechanism, and that confirmation of receipt of the message is also provide.

It is furthermore advantageous that the device can be addressed in direct and personalized fashion via an additional radio receiver. According to one embodiment of the present invention, the automobile radio device advantageously may include an additional radio receiver.

DETAILED DESCRIPTION

Figure 1:
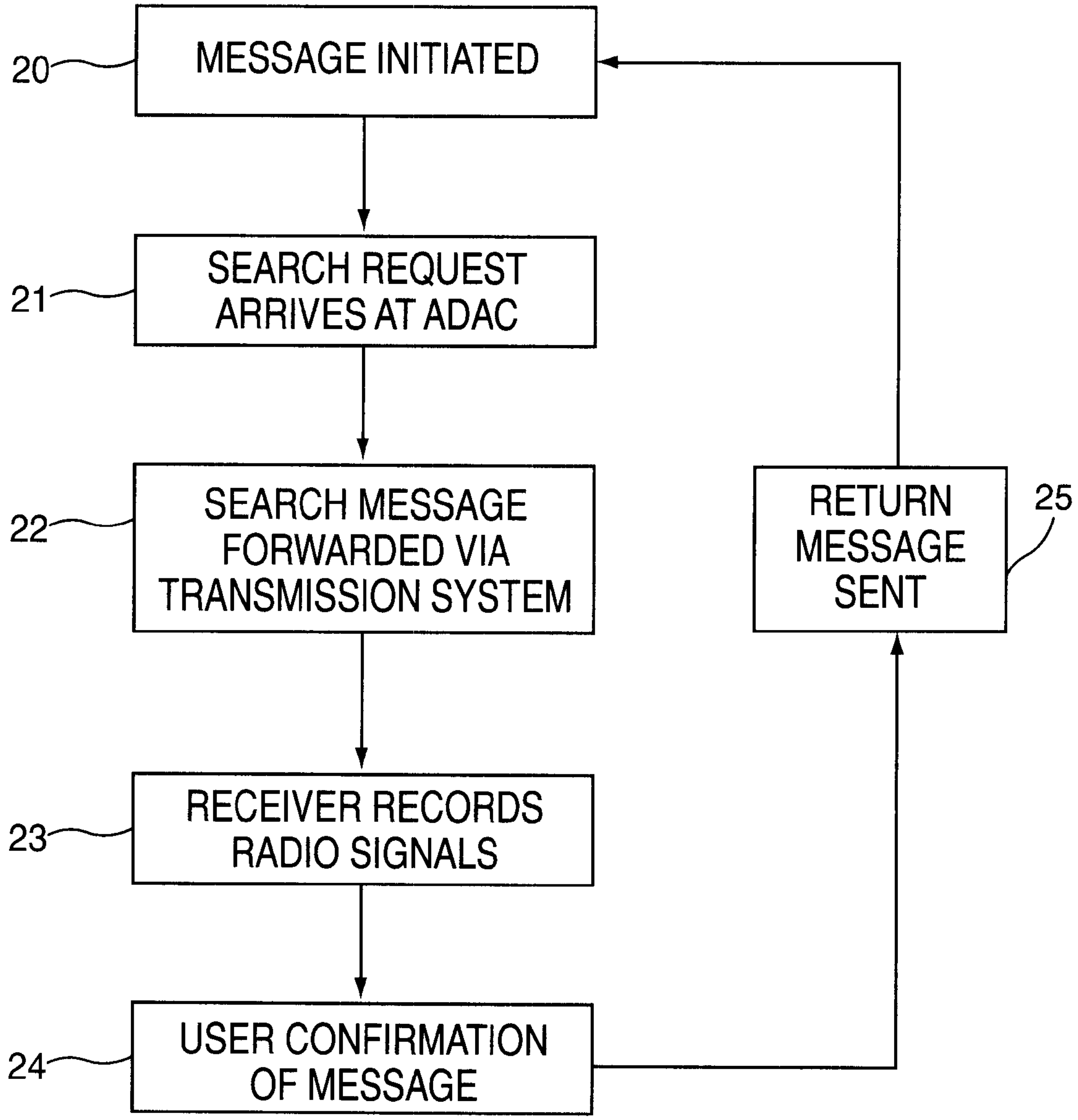
FIG. 1 is a flowchart of steps for the transmission of a message to a person being sought according to one embodiment of the present invention.

The present invention proposes an expanded functionality of existing receiving systems, such as an automobile radio device or a navigation system in a motor vehicle. FIG. 1 is a flowchart of steps for the transmission of a message to a person being sought according to one embodiment of the present invention. In Step 20, the need to convey a message is ascertained. According to one embodiment of the present invention, when a person is being sought, the request for a search is transmitted by telephone at the ADAC central office Step 21. In Step 22, the search message is forwarded via a suitable transmission system and a signal is sent out to the additional receiver of the automobile radio device that is being used by the person being sought using the indentifier for that radio device. In Step 23, the radio device used by the persons being sought records both the directly transmitted radio signals and the voice signal received via the radio.

According to one embodiment of the present invention, the identifier of the automobile radio device 15, for example, a manufacturer's serial number or the motor vehicle license plate number. According to one embodiment of the present invention, upon receipt of a message, operation of the automobile radio device is interrupted by a suitable circuit. According to an alternative embodiment the motor vehicle itself is rendered in a deactivated state by way of the known electronic drive lock. In step 24, the user can confirm receipt of the message and thereby cancel the operating inhibition on his or her device. The return message can then be sent directly by the person being sought 25. According to one embodiment of the present invention, in addition to the broadcast radio text of the emergency transmission, the relevant telephone number is also forwarded directly to the device of the person being sought. If the broadcast radio receiver possesses a so-called Traffic Information Memory (TIM) function, the broadcast radio messages are stored in a special memory, and can then be retrieved. If the user does not have a device of this kind available, it is often sufficient simply to have the calling number transmitted.

According to one embodiment of the present invention, the spoken broadcast radio message interrupts operation of the device.

According to one embodiment of the present invention, a received telephone number is compared with personal and address data using a mass memory. All that is needed for this functionality is a CD player, in the trunk of the vehicle, which contains a CD on which all addresses, names, and telephone numbers are stored. By comparing the transmitted telephone number with the data on the CD, it is easy to determine the address of the person to be contacted.

Figure 2:
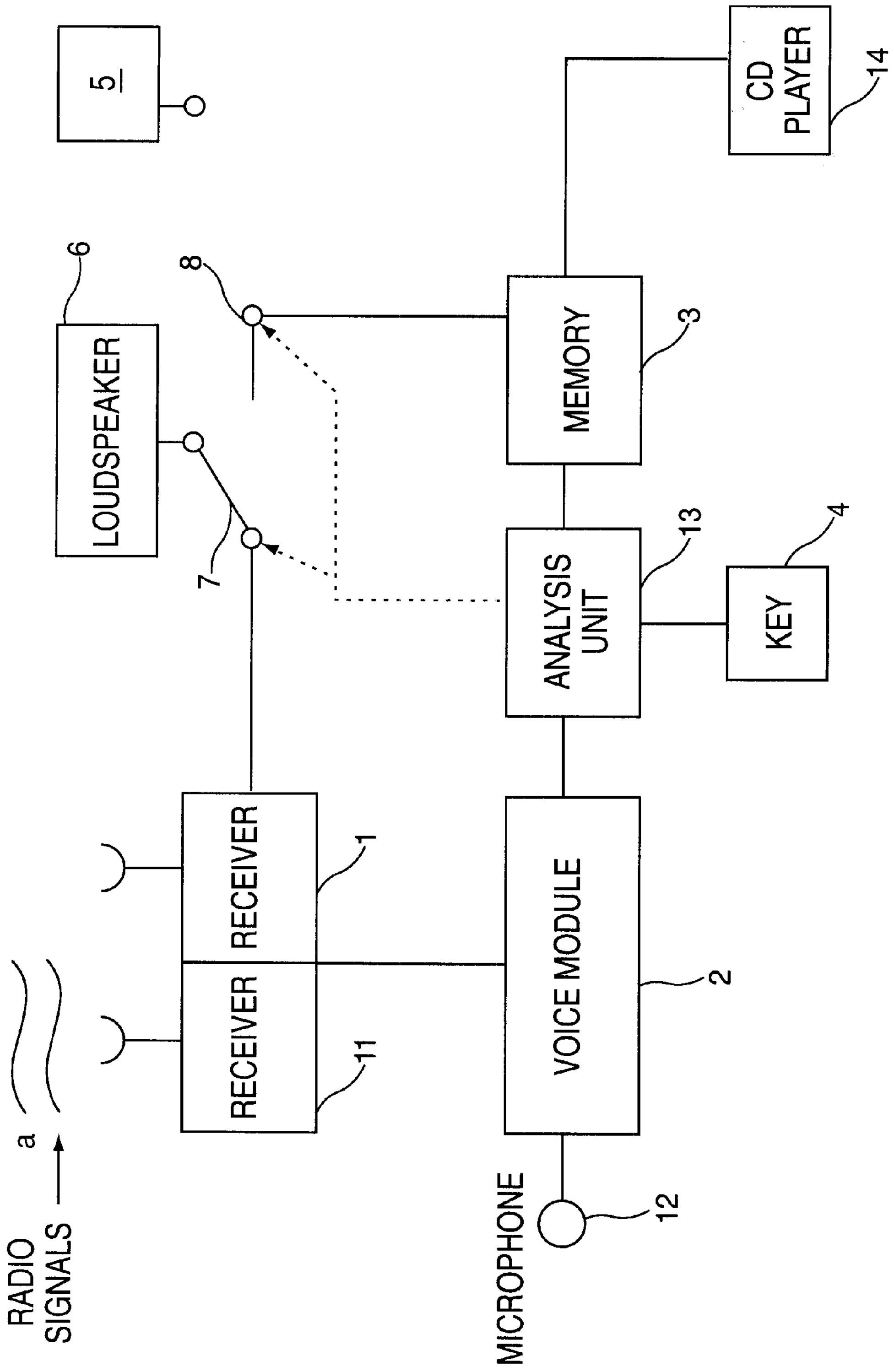
FIG. 2 is a block diagram of an automobile radio device according to one embodiment of the present invention.

FIG. 2 is a block diagram of an automobile radio device according to the present invention. Broadcast radio signals 9 are accepted and received by receiver 1. The signals are transmitted via switch 7 to the normal voice output via loudspeaker 6. If the receiver has the Traffic Information Memory (TIM) function, the messages, characterized by an audio sequence, are sensed by a voice module 2 and are stored by analysis unit 13 in a special memory 3. These data are then always available upon request. The device according to the present invention possesses, in addition to broadcast radio reception section 1, a receiver for radio signals 11. If additional messages are received via receiver 11, analysis unit 13 recognizes this fact and temporarily stores the information, again in memory 3. Switch 7 or 8 is simultaneously actuated so that normal operation of the broadcast radio device is interrupted. Not until the user acknowledges the message via a key 4 is the message reproduced from memory 3 via the display or, selectably, also via the loudspeaker. Confirmation of the message can also be accomplished via a microphone 12 and voice module 2. If only a telephone number were to be transmitted via the direct radio connection, it is also stored in memory 3. Analysis unit 13 can then, by way of CD player 14, perform a data comparison with a telephone directory.

What is claimed is:

1. A method for receiving messages via an automobile radio device, the device including a radio receiver for receiving broadcast radio signals, an analysis unit, a memory coupled to the analysis unit, and an audio reproduction unit, comprising the steps of:

sending a message over a radio link;

receiving the message on the radio receiver;

storing the message in memory by the analysis unit; and interrupting a currently active audio reproduction until an acknowledgment signal that the message has been received is detected.

2. The method according to claim 1, wherein the message includes a voice sequence using an audio format and the message is transmitted over a broadcast radio link.

3. The method according to claim 1, further comprising the step of:

receiving the message by a second, directly addressable radio receiver.

4. The method according to claim 1, further comprising the step of:

digitizing the message prior to sending the message, the radio receiver receiving the message in a digital format.

5. The method according to claim 1, wherein the radio receiver includes a receiver identifier corresponding to a vehicle license plate number.

6. The method according to claim 1, further comprising the step of:

reproducing the message on at least one of a display device and a voice output device.

7. The method according to claim 1, further including the step of:

playing an audio sequence after the message is received.

8. The method according to claim 1, further including the step of:

displaying a luminous indicator after the message is received.

9. The method according to claim 1, further comprising the step of:

initiating the acknowledgment signal upon selection of an input key.

10. The method according to claim 1, wherein the message includes a telephone number, the method further comprising the step of:, comparing the telephone number with at least one data record stored in a mass memory to select a matching data record, and at least one data record including personal day supplementing the message with the personal data.

11. A method for receiving messages via an automobile radio device, the device including a radio receiver for receiving broadcast radio signals, an analysis unit, a memory coupled to the analysis unit, and an audio reproduction unit, the method comprising:

sending a message over a radio link;

receiving the message on the radio receiver;

storing the message in memory by the analysis unit;

interrupting a currently active audio reproduction until an acknowledgment signal that the message has been received is detected; and initiating the acknowledgment signal by speaking a voice command into a microphone device.

12. An automobile radio device including:

a receiver for receiving broadcast radio signals;

an analysis unit;

a memory coupled to the analysis unit;

an audio reproduction unit coupled to the receiver for reproducing audio signals of the broadcast radio signals;

a switching mechanism, activated by the analysis unit configured to interrupt output of the audio signals by the audio reproduction unit if a message is received; and a signal generator for generating a confirmation to confirm receipt of the message.

13. The electrical device according to claim 12, further comprising:

a second radio receiver, addressed by an identifier, the second radio receiver being monitored by the analysis unit.

14. An automobile radio device, comprising:

a receiver configured to receive broadcast radio signals;

an analysis unit;

a memory coupled to the analysis unit;

an audio reproduction unit coupled to the receiver and configured to reproduce audio signals;

a switch activated by the analysis unit configured to interrupt output of the audio signals by the audio reproduction unit when a message is received via the receiver, the message being stored in the memory; and a signal generator configured to generate a confirmation signal to confirm receipt of the message, the output of the audio signals by the audio reproduction unit being interrupted until receipt of the message is confirmed via the confirmation signal.

* * * * *